United States Patent
Mitsui et al.

(10) Patent No.: US 7,148,911 B1
(45) Date of Patent: Dec. 12, 2006

(54) VIDEOPHONE DEVICE

(75) Inventors: Kenichi Mitsui, Yokohama (JP); Toshiyuki Toda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,143

(22) PCT Filed: Aug. 8, 2000

(86) PCT No.: PCT/JP00/05313

§ 371 (c)(1),
(2), (4) Date: Apr. 6, 2001

(87) PCT Pub. No.: WO01/11881

PCT Pub. Date: Feb. 15, 2001

(30) Foreign Application Priority Data

Aug. 9, 1999 (JP) .................................. 11-225542

(51) Int. Cl.
*H04N 7/14* (2006.01)
(52) U.S. Cl. ................ 348/14.01; 348/14.02; 348/14.07; 455/556.1
(58) Field of Classification Search .. 348/14.01–14.03, 348/14.05, 14.07–14.1, 14.14–14.16; 379/93.17, 379/93.21, 93.23; 345/753; 370/260–263; 709/204; 455/556, 566, 575, 90, 420.01, 455/550.1, 569.1, 556.1, 420.1, 558.1, 568; 715/753
See application file for complete search history.

(56) References Cited

U.S. PATENT DOCUMENTS

| | | | | |
|---|---|---|---|---|
| 5,438,436 A | * | 8/1995 | Harris | 358/500 |
| 5,786,846 A | | 7/1998 | Hiroaki et al. | 348/14.16 |
| 5,900,909 A | * | 5/1999 | Parulski et al. | 348/231.6 |
| 6,009,336 A | * | 12/1999 | Harris et al. | 455/566 |
| 6,334,063 B1 | * | 12/2001 | Charlier et al. | 455/566 |
| 6,377,818 B1 | * | 4/2002 | Irube et al. | 455/556 |

(Continued)

FOREIGN PATENT DOCUMENTS

EP  0 738 075 B1  10/2000

(Continued)

OTHER PUBLICATIONS

WO98/39906, Communication Terminal, Sep. 1998, (English abstract).

*Primary Examiner*—Melur Ramakrishnaiah
(74) *Attorney, Agent, or Firm*—Pearne & Gordon LLP

(57) ABSTRACT

Providing video telephone apparatus where the orientation of a picked-up image or a received image can be changed according to the orientation of the image pick-up section or the display, thus allowing transmission or display of a proper image at any time.

In video telephone apparatus according to the invention, an image pick-up section outputs the image data on the target object to a transmit image rotating section. The transmit image rotating section performs rotation processing on a picked-up image so that the upper side of an image pick-up section in the vertical direction coincides with the upper side of an image to transmit to the distant party, based on the orientation of the image pick-up section detected by an image pick-up vertical direction detector. A picture signal received from the distant party is demodulated and output to a receive image rotating section. The receive image rotating section performs rotation processing so that the upper side of the receive image is at the upper side of a display in the vertical direction, based on the vertical direction of the image pick-up section of the an image pick-up vertical direction detector, that is, the orientation of the display.

15 Claims, 9 Drawing Sheets

U.S. PATENT DOCUMENTS 6,411,828 B1 * 6/2002 Lands et al. ............ 455/569.1

FOREIGN PATENT DOCUMENTS

| GB | 2 261 576 | 5/1993 |
|----|-----------|--------|
| JP | 8-28085 | 8/1973 |
| JP | 4-238475 | 8/1992 |
| JP | 05-037887 | 2/1993 |
| JP | 5-56424 | 3/1993 |
| JP | 5-136865 | 6/1993 |
| JP | 06253295 | 9/1994 |
| JP | 6-315108 | 11/1994 |
| JP | 7-104889 | 4/1995 |
| JP | 08-065647 | 3/1996 |
| JP | 8-65647 | 3/1996 |
| JP | 8-139788 | 5/1996 |
| JP | 8-321863 | 12/1996 |
| JP | 08-336069 | 12/1996 |
| JP | 9-27939 | 1/1997 |
| JP | 9-44143 | 2/1997 |
| JP | 09/083853 | 3/1997 |
| JP | 09-083981 | 3/1997 |
| JP | 9-83981 | 3/1997 |
| JP | 10-13722 | 1/1998 |
| JP | 10-065780 | 3/1998 |
| JP | 10-075287 | 3/1998 |
| JP | 10-108152 | 4/1998 |
| JP | 10-164401 | 6/1998 |
| JP | 10-164426 | 6/1998 |
| JP | 10-233993 | 9/1998 |
| JP | 10-313452 | 11/1998 |
| JP | 10-336311 | 12/1998 |
| JP | 11-088758 | 3/1999 |
| JP | 11-136655 | 5/1999 |
| JP | 11-196397 | 7/1999 |
| JP | 11196397 A * | 7/1999 |
| WO | WO98/39906 | 9/1998 |

* cited by examiner

VIDEOPHONE DEVICE

TECHNICAL FIELD

The present invention relates to video telephone apparatus that transmits/receives image information and audio information.

BACKGROUND OF THE INVENTION

In recent years, digital lines that can transmit/receive audio information and video information via a multichannel system such as the ISDN (integrated services digital network) have been in commercial use. In line with such a trend, the video telephone apparatus has come into widespread use. The video telephone apparatus is composed of at least transmitter means for transmitting images picket up via image pick-up means and associated voice data from the local party or user of the video telephone apparatus to the distant party, receiver means for receiving images and associated voice data from the distant party, and display means for displaying the images on a display and so on. While a liquid crystal panel is used as the display means based on the advantages of lightweight and low-profile design, the liquid crystal panel has a nature that it has a narrower angle of visibility than that of the CRT tube and that the angle of visibility differs between vertical direction and horizontal direction due to the properties of the liquid crystal material thus the angle on one side is further narrowed. As a result, there occurred such a problem as viewers in the center among a plurality of viewers could view a crisp image but the remaining viewers could not.

To solve such a problem, the Japanese Patent Laid-Open No. 56424/1993 disclosed video telephone apparatus comprising a selector circuit and a rotary plate. In this disclosure, the selector circuit was used to invert the inputs of picture signals to a horizontal side and a vertical side of the liquid crystal panel and the rotary plate was used to change the vertical-horizontal physical relationship of the liquid crystal display with the video telephone apparatus in order to conveniently view the images displayed on the crystal display panel formed in a rectangle whose vertical length differs from the horizontal length.

FIG. 9 shows the configuration of conventional video telephone apparatus. The conventional video telephone apparatus is composed of a crystal display panel 22 used as a monitor for displaying image information, a selector circuit 23 for switching between the horizontal direction and the vertical direction of an image displayed on the liquid crystal panel 22, and a rotary plate mounting the liquid crystal panel 22. The selector circuit 23 inverts the inputs of picture signals to a horizontal side and a vertical side of the liquid crystal panel 22 and switches between the horizontal direction and the vertical direction of an image displayed on the liquid crystal panel 22. The rotary plate 24 changes the vertical-horizontal physical relationship of the liquid crystal display 22 with the video telephone apparatus by rotating the liquid crystal panel mounted thereon.

Via such a configuration, it is possible for liquid crystal display such as a liquid crystal panel whose directivity of angle of visibility is inevitable to provide image display that efficiently uses the nature of the angle of visibility, by changing the vertical-horizontal relationship while properly maintaining the horizontal-vertical display relationship of an image.

When placing a call by using such video telephone apparatus, in particular a video telephone apparatus that can be transported, the user makes conversation with the receiver of the video telephone apparatus applied to his/her ear (hereinafter referred to as close-talking) or with the video telephone apparatus main unit placed on a desk, etc., without holding it in order to use the apparatus mainly as a video telephone set (hereinafter referred to as hands-free talking). The shape of portable video telephone apparatus is mostly a rod-like rectangular parallelepiped. In case the user makes conversation for example via hands-free talking, he/she often places video telephone apparatus in a fixed, stable state, that is, with the longitudinal direction of the enclosure placed horizontally or vertically with the mounting surface.

As mentioned earlier, the orientation of the video telephone apparatus main unit differs with the form of talking and the orientation of the image pick-up means and the display means provided on the video telephone apparatus main unit also differs accordingly. Thus, it is necessary to process and transmit an image picked up by image pick-up means so that the image may be in a normal orientation and the image may be displayed in a normal orientation on the display means.

However, via the aforementioned video telephone apparatus, it is impossible to change the orientation of an image picked up by image pick-up means (hereinafter simply referred to as a picked-up image) and change the orientation of an image received from the distant party (hereinafter referred to as a received image) on display means, according to the form of talking. Thus, problems arise that a picked-up image is transmitted to the distant party with the orientation of the image left unnatural and that the image is displayed in an unnatural orientation.

The invention solves the problems and aims at providing video telephone apparatus where the orientation of a picked-up image or a received image can be changed via the orientation of image pick-up means or display means so that a proper image can be always transmitted or displayed.

Another object of the invention is to provide video telephone apparatus that allows selection of proper receiver means and transmitter means appropriate according to the orientation of image pick-up means or display means, that is, selection between close-talking as a talking form where received voice data is regenerated by a receiver used in the close proximity of the user's ear and transmitted voice data is collected by a microphone used in the close proximity of the user's mouth, and hands-free talking where received voice data is regenerated by a received used away from the user's ears and transmitted voice data is collected by a microphone used away from the user's mouth.

Disclosure of the Invention

In order to attain the aforementioned objects, the invention has the following aspects:

(1) video telephone apparatus comprising image pick-up means for picking up the image of an object and generating a transmit picture signal according to the image of the object, communication means for transmitting and receiving said transmit picture signal and a receive picture signal, and display means for displaying video information based on the receive picture signal received from said communication means, characterized in that said video telephone apparatus comprises detector means for detecting the orientation of said video telephone apparatus and a rotating means for rotating the orientation of an image in at least either of said transmit picture signal and said receive picture signal.

In the video telephone apparatus according to the aspect (1), an image picked up by the image pick-up means and/or an image transmitted from the distant party is rotated according to the direction of the video telephone apparatus. Thus, a picked-up image is transmitted in a normal orientation and an image transmitted from the distant party is displayed in a normal orientation, even in case the video telephone apparatus is used in a variety of orientations according to the form of communications.

(2) video telephone apparatus according to the aspect (1), characterized in that detector means for detecting the orientation of said video telephone apparatus has image pick-up direction detector means for detecting the vertical direction of said iii.

In the video telephone apparatus according to the aspect (2), the orientation of the video telephone apparatus main unit and the orientation of the display means are determined by detecting the vertical direction of image pick-up means via image pick-up direction detector means. The video telephone apparatus rotates an picked-up image according to the orientation of the image pick-up means and rotates a received image transmitted from the distant party according to the orientation of the display means. Thus, a picked-up image is transmitted in a normal orientation and a received image transmitted from the distant party is displayed in a normal orientation.

(3) video telephone apparatus according to the aspect (1), characterized in that detector means for detecting the orientation of said video telephone apparatus has display direction detector means for detecting the vertical direction of said display means.

In the video telephone apparatus according to the aspect (3), the orientation of the video telephone apparatus main unit and the orientation of the image pick-up means are determined by detecting the vertical direction of the display means via display direction detector means. The display direction detector means rotates an picked-up image according to the orientation of the image pick-up means and rotates a received image transmitted from the distant party according to the orientation of the display means. Thus, a picked-up image is transmitted in a normal orientation and a received image transmitted from the distant party is displayed in a normal orientation.

(4) video telephone apparatus according to any of the aspects (1) through (3), characterized in that said rotating means has transmit image rotating means for performing rotation processing on said transmit picture signal based on the orientation of said video telephone apparatus.

In the video telephone apparatus according to the aspect (4), the orientation of the transmit picture signal that is based on the picked-up image is rotated based on the orientation of the video telephone apparatus. Thus, a picked-up image is transmitted in a normal orientation even in case the video telephone apparatus is used in a variety of orientations according to the positioning for talking.

(5) video telephone apparatus according to any of the aspects (1) through (4), characterized in that said rotating means has receive image rotating means for performing rotation processing on said receive picture signal based on the orientation of said video telephone apparatus.

In the video telephone apparatus according to the aspect (5), the orientation of the receive picture signal that is based on the received image is rotated based on the orientation of the video telephone apparatus. Thus, a received image transmitted from the distant party is displayed in a normal orientation even in case the video telephone apparatus is used in a variety of orientations according to the form of talking.

(6) video telephone apparatus according to any of the aspects (1) through (5), characterized in that said video telephone apparatus comprises a first receiver means for regenerating a receive audio signal received from said communication means, a second receiver means for regenerating the receive audio signal received from said communication means to a signal level different from that of the first receiver means, and a receiver selector means for switching between said first receiver means and said second receiver means based on the orientation of said video telephone apparatus.

In the video telephone apparatus according to the aspect (6), switching is made between the first receiver means and the second receiver means based on the orientation of the video telephone apparatus. Thus, the user can make proper -conversation according to the current situation via talking form of the video telephone apparatus.

Another configuration is possible where said first receiver means and said second receiver means are realized via single receiver means and the use form of the video telephone apparatus is detected based on the orientation of the video telephone apparatus to switch the signal level of an audio signal received via the receiver selector means. Thus, it is possible for the user to make conversation fit for the talking form of the video telephone apparatus via single receiver means.

(7) video telephone apparatus according to any of the aspects (1) through (6), characterized in that said video telephone apparatus comprises a first transmitter means for converting voice data into an electric signal to generate a transmit audio signal, a second transmitter means for converting voice data into an electric signal to generate a transmit audio signal whose signal level differs from that of the first receiver means, and a transmitter selector means for switching between said first transmitter means and said second transmitter means based on the orientation of said video telephone apparatus.

In the video telephone apparatus according to the aspect (7), switching is made between the first transmitter means and the second transmitter means based on the orientation of the video telephone apparatus. Thus, the user can make proper conversation according to the current situation via talking form of the video telephone apparatus.

Another configuration is possible where said first transmitter means and said second transmitter means are realized via single transmitter means and the use form of the video telephone apparatus is detected based on the orientation of the video telephone apparatus to switch the signal level of an audio signal transmitted via the transmitter selector means. Thus, it is possible for the user to make conversation fit for the talking form of the video telephone apparatus via single transmitter means.

(8) video telephone apparatus according to the aspect (6), characterized in that said receiver selector means has picked-up image receiver means for switching between said first receiver means and said second receiver means based on the vertical direction of image pick-up means detected by image pick-up means detector means.

In the video telephone apparatus according to the aspect (8), the use form of the video telephone apparatus is detected based on the orientation of the iii, that is, the orientation of the video telephone apparatus main unit to switch between the first receiver means and the second receiver means. Thus, the user can make proper conversation fit for the current situation.

(9) video telephone apparatus according to the aspect (6), characterized in that said receiver selector means is display receiver selector means and switches between said first receiver means and said second receiver means based on the vertical direction or horizontal direction of the display means detected by display means detector means.

In the video telephone apparatus according to the aspect (9), the use form of the video telephone apparatus is detected based on the orientation of the display means, that is, the orientation of the video telephone apparatus main unit to switch between the first receiver means and the second receiver means. Thus, the user can make proper conversation according to the current situation via talking form of the video telephone apparatus.

(10) video telephone apparatus according to the aspect (7), characterized in that said transmitter selector means has picked-up image transmitter means for switching between said first transmitter means and said second transmitter means based on the vertical direction of image pick-up means detected by image pick-up means detector means.

In the video telephone apparatus according to the aspect (10), the use form of the video telephone apparatus is detected based on the orientation of the iii, that is, the orientation of the video telephone apparatus main unit to switch between the first transmitter means and the second transmitter means. Thus, the user can make proper conversation fit for the current situation.

(11) video telephone apparatus according to the aspect (7), characterized in that said transmitter selector means has display transmitter selector means for switching between said first transmitter means and said second transmitter means based on the vertical direction of display means detected by display means detector means.

In the video telephone apparatus according to the aspect (11), the use form of the video telephone apparatus is detected based on the orientation of the display means, that is, the orientation of the video telephone apparatus main unit to switch between the first transmitter means and the second transmitter means. Thus, the user can make proper conversation according to the current situation via talking form of the video telephone apparatus.

Figure 1:
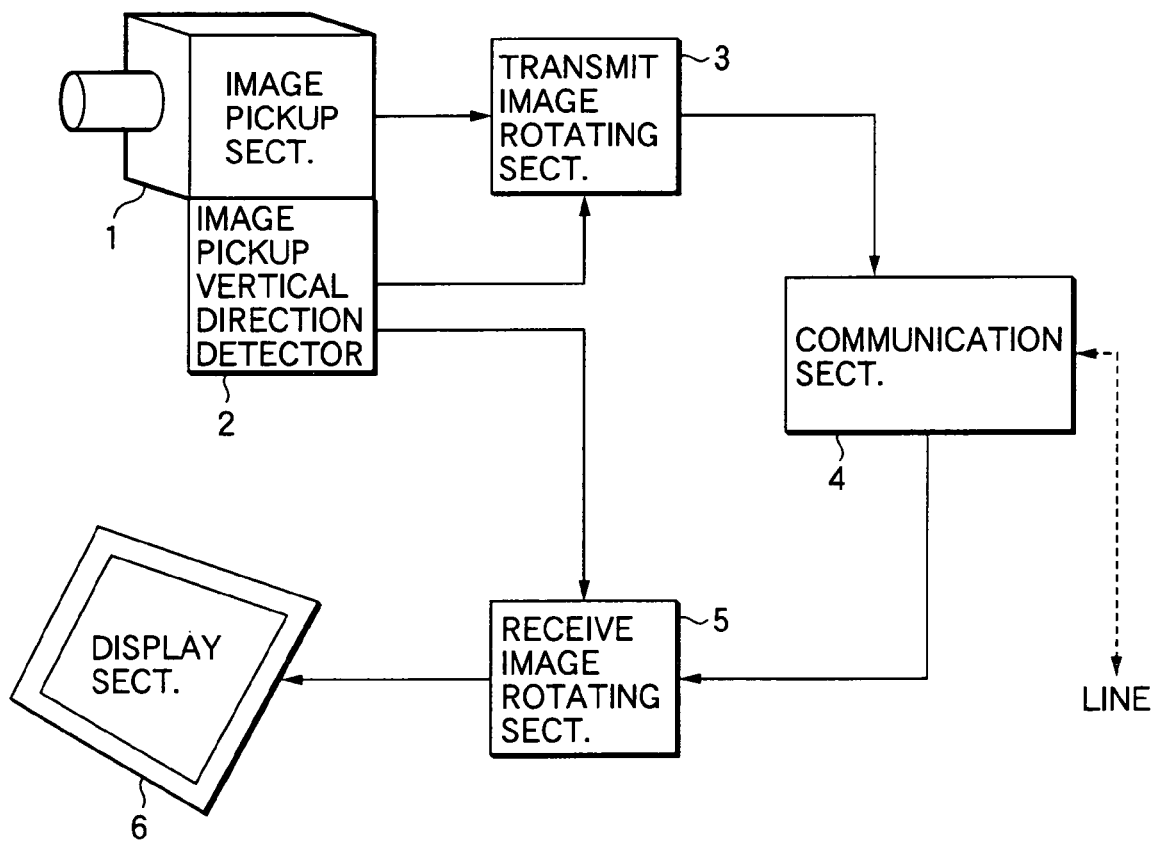
FIG. 1 is a block diagram showing the configuration of video telephone apparatus according to the first embodiment of the invention.

In the figures are shown an image pick-up section 1, an image pick-up vertical direction detector 2, a transmit image rotating section 3, a communication section 4, a receive image rotating section 5, a display 6, a display vertical direction detector 13, a first receiver 14, a second receiver 15, a picked-up image transmitter selector 19, a display receiver selector 20, and a display transmitter selector 21.

BEST MODE FOR CARRYING OUT THE INVENTION

Embodiment of the invention will be described referring to the drawings.

Video telephone apparatus according to embodiments of the invention is used as mobile communications apparatus such as a personal handy phone and a portable telephone set and in particular preferable to portable apparatus.

FIRST EMBODIMENT

Video telephone apparatus according to the first embodiment can transmit and display a picked-up image and a received image in a normal state by rotating the picked-up image and the received image based on the vertical direction of iii, irrespective of the form of talking of the video telephone apparatus.

Figure 2:
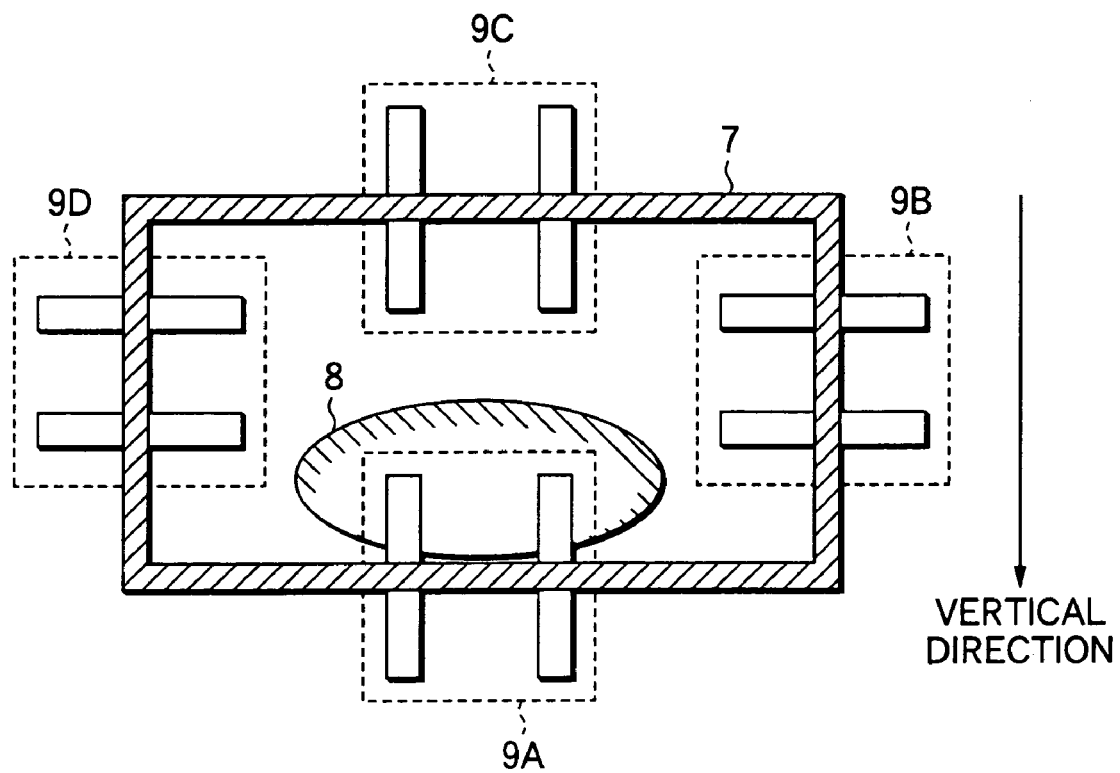
FIG. 2 is a longitudinal section showing a configuration of the image pick-up vertical direction detector.
Figure 3A:
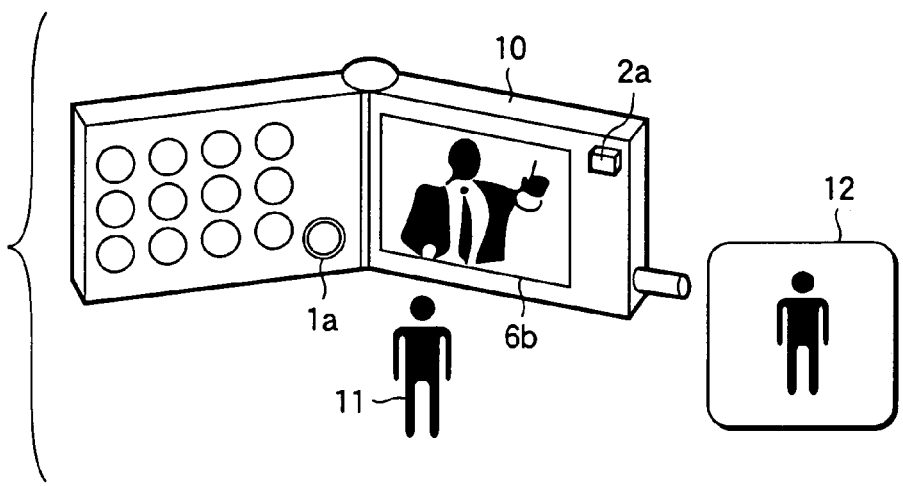
FIG. 3 is a perspective view showing a positioning example of video telephone apparatus main unit.
Figure 3B:
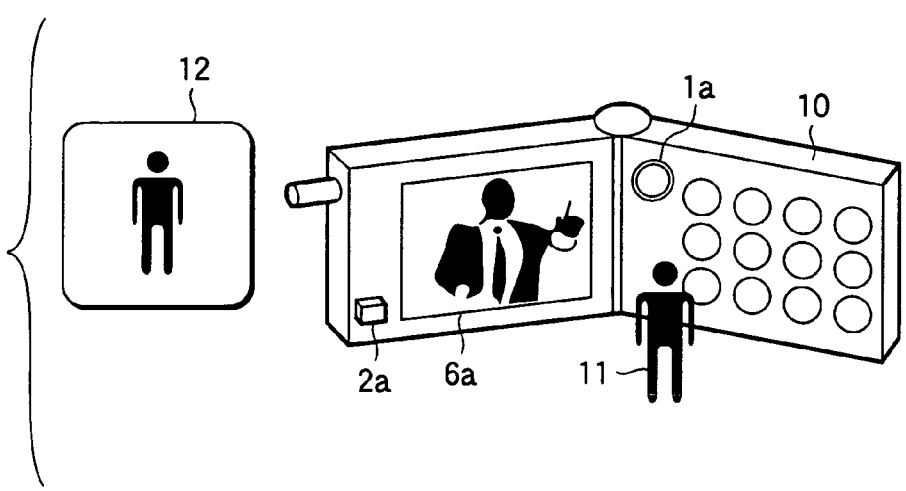
Figure 3C:
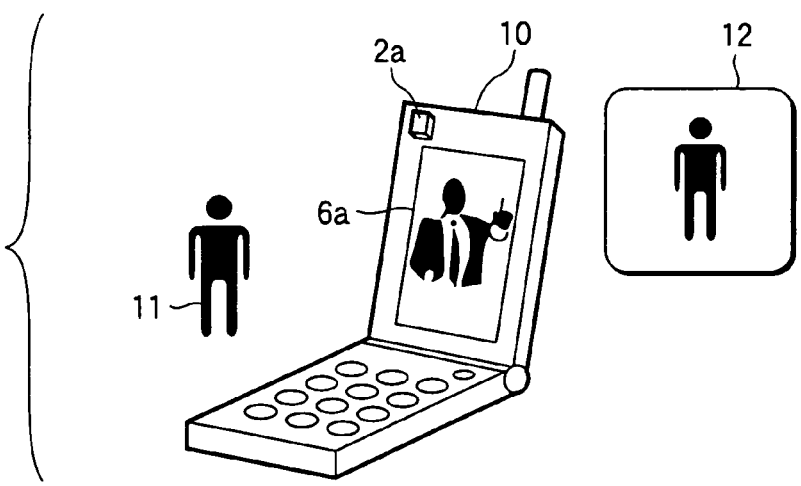
Figure 4A:
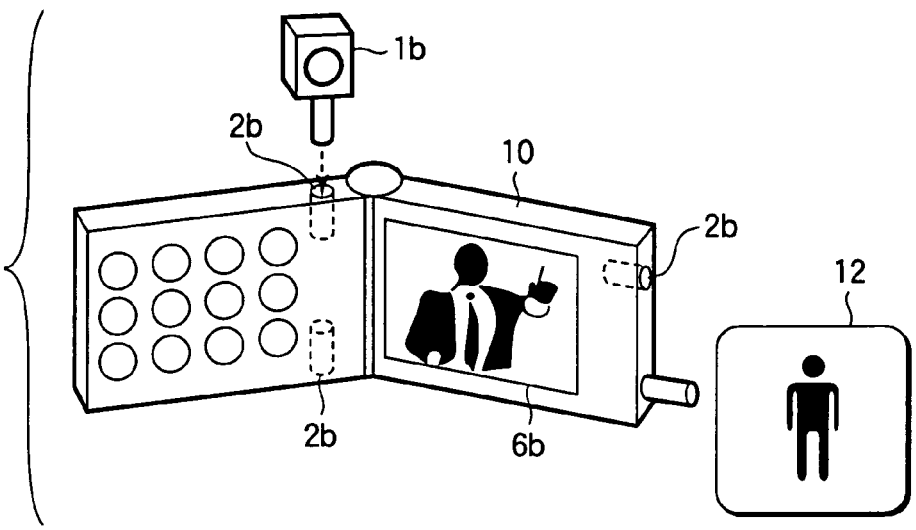
FIG. 4 is a perspective view showing a positioning example of video telephone apparatus main unit having a detachable image pick-up section.
Figure 4B:
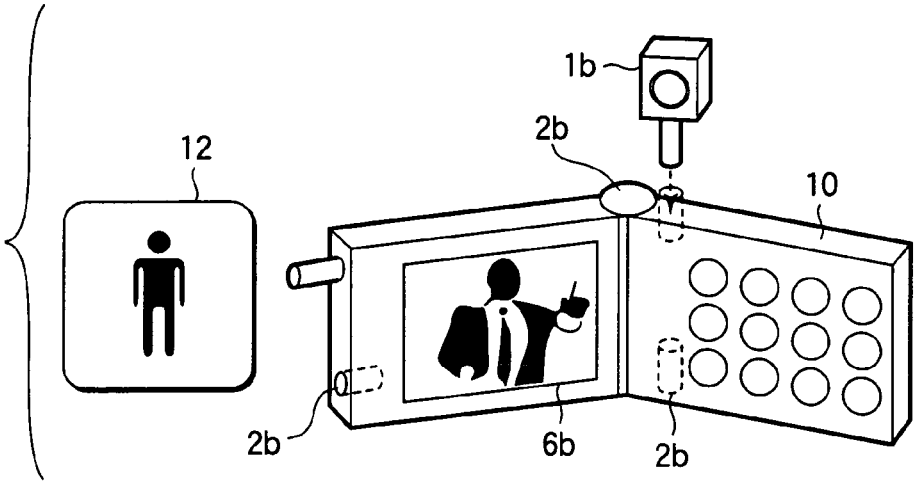
Figure 4C:
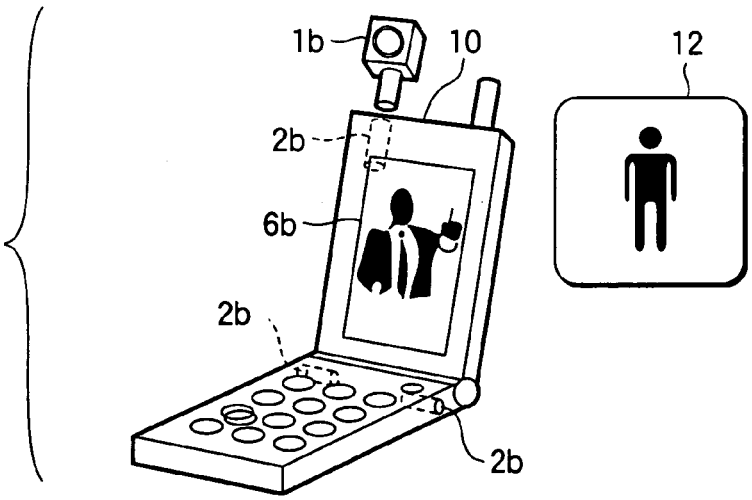

FIG. 1 is a block diagram showing the configuration of video telephone apparatus according to the first embodiment of the invention. FIG. 2 is a longitudinal section showing a configuration of the image pick-up vertical direction detector. FIG. 3 is a perspective view showing a positioning example of video telephone apparatus main unit 10. FIG. 4 is a perspective view showing a positioning example of video telephone apparatus main unit 10 having a detachable image pick-up section 1*b*.

As shown in FIG. 1, video telephone apparatus according to the first embodiment has an image pick-up section 1 corresponding to image pick-up means for picking up the image of an object and generating a picture signal according to the image of the object, an image pick-up vertical direction detector 2 corresponding to image pick-up direction detector means for detecting the vertical direction of the image pick-up section 1 and determining the orientation of the video telephone apparatus, a transmit image rotating section 3 corresponding to transmit image rotating means for receiving a picture signal from the image pick-up section 1 and performing rotation processing on the signal based on the vertical direction of the image pick-up section 1 detected by the image pick-up vertical direction detector 2, and a communication section 4 corresponding to communication means for modulating and transmitting a picture signal (transmit picture signal) to send from the local party via a communication circuit that is a radio link or a wired circuit.

The video telephone apparatus according to the first embodiment also has a communication section 4 for receiving and demodulating a picture signal (receive picture signal) sent from the distant party via a communication circuit that is a radio link or a wired circuit, and a receive image rotating section 5 corresponding to receive image rotating means for receiving the demodulated picture signal and performing rotation processing on the signal, a display 6 corresponding to display means for displaying as an image the picture signal that has undergone rotation processing. It is assumed that the orientation of the video telephone apparatus main unit, the image pick-up section and the display is the same as the orientation of the video telephone apparatus.

Receiving operation and transmitting operation of the video telephone apparatus will be described below.

(Transmitting Operation)

When an image is transmitted, the image of an object is picked up by an image pick-up section 1 in the first place. The image pick-up section 1 further converts image data on the target object to an electric signal to generate a picture signal and output the picture signal to the transmit image rotating section 3. In this practice, the image pick-up vertical direction detector 2 detects the vertical direction of the image pick-up section 1 and outputs the results to the transmit image rotating section 3 and the receive image rotating section 5. The image pick-up vertical direction detector 2 detects the vertical direction by using a contact of mercury and an electrode. As shown in FIG. 2, the image pick-up vertical direction detector 2 is composed of an enclosure 7 composed of glass, etc., mercury 8 encapsulated within this enclosure 7, electrode pairs 9A, 9B, 9C, 9D provided on upper and lower left/right sections to penetrate the walls of the enclosure 7.

By the gravity of the mercury 8, the mercury 8 is placed in the lower section of the enclosure 7 and serves to short-circuit the electrode pair 9A as shown in the figure. The same applies to the other electrode pairs and the electrode pairs in the lower section of the enclosure are short-circuited by mercury. As a result, by detecting the short-circuit, it is possible to detect for example an electrode pair 9A in FIG. 2. The section short-circuited by mercury indicates the lower section of the enclosure in the vertical direction thus allowing detection of the vertical direction.

Referring to FIG. 1 again, the transmit image rotating section 3, on receiving information on the image pick-up section in the vertical direction thus detected and a picture signal of a picked-up image picked up by the image pick-up section, performs rotation processing on the picture signal so that the upper side of the picked-up image in the vertical direction of the image pick-up section 1, that is, the upper side of the object in the vertical direction may coincide with the upper side of the image to be transmitted to the distant party. The picture signal processed by the transmit image rotating section is modulated by the communication section 4 and transmitted to the distant party via a communication circuit.

The image pick-up vertical direction detector 2 is not limited to one that uses mercury shown in FIG. 2. Another method of detecting the vertical direction is for example an approach whereby the Haugh transform is used to draw the edge of the image obtained via the image pick-up section 1 and straight line appearing over a predetermined frequency are extracted to obtain statistics of the angles of the straight lines, with the straight line most frequently detected is assumed as the vertical direction.

When the image of an object is picked via the image pick-up section, buildings are a selected as a background or an object itself. These buildings generally stand in vertical direction so that the picked-up image contains a great number of straight line in the vertical direction. Thus, it is possible to use the Haugh transform and to extract straight lines having a variety of angles included in the picked-up image then to assume the straight line of the most frequent angle as the vertical direction, thereby allowing detection of the vertical direction. However, the vertical direction detecting means using the Haugh transform gives the same results when rotated by 180 degrees. Thus, the positioning angle of the video telephone apparatus is limited within 90 degrees from the vertical orientation to the position where the right side is at the bottom. Detailed description of the Haugh transform is omitted because it is a well known technology.

(Receiving Operation)

When an image is received, the picture signal received by the communication section 4 is demodulated and output to the receive image rotating section 5. The receive image rotating section 5 that has received the demodulated picture signal performs rotation processing on the picture signal so that the upper side of the received image is displayed at the upper side of the display 6 in the vertical direction, that is, so that the image transmitted from the distant party may be displayed normally at the local party, based on the vertical direction information of the image pick-up section 1 detected by the image pick-up vertical direction detector 2, that is, based on the information on the orientation of the video telephone apparatus main unit and the display 6. The picture signal that has undergone rotation processing is displayed as an image on the display 6.

Next, a first positioning example of video telephone apparatus according to this embodiment will be described referring to FIG. 3. In FIG. 3, video telephone apparatus according to the first example is composed of a video telephone apparatus main unit 10, as image pick-up section 1a provided in the video telephone apparatus main unit 10, an image pick-up vertical direction detector 2, and a display 6. The video telephone apparatus main unit 10 is placed as shown in the first to third positioning examples in FIGS. 3 (*a*) through (*c*) when used hands-free. Description of the components in FIG. 3 that serve to act the same as the means shown in FIG. 1 is omitted.

FIG. 3 (*a*) is an example where the longitudinal direction of the video telephone apparatus main unit according to this embodiment is placed horizontally to the positioning surface so that the upper side (antenna) of the video telephone apparatus main unit may be on the left side in the figure. Further description assumes the positioning example of FIG. 3 (*a*) as a reference. In FIG. 3 (*a*), image data of the object 11 whose image was picked up by the image pick-up section 1a is transmitted in a normal orientation as a transmit image 12 without rotation processing. The image received via the communication section 4 is displayed in a normal orientation without rotation processing.

The second positioning example in FIG. 3 (*b*) shows a case where the image is rotated by 180 degrees from the first positioning example in FIG. 3 (*a*). In this case, the object whose image was picked up by the image pick-up section 1a is output as an image with the object 11 upside down to the transmit image rotating section 3. Thus, the transmit image rotating section 3 performs rotation processing on the picture signal so that the upper side of the image pick-up section 1a in the vertical direction, that is, the upper side of the object 11 in the vertical direction may coincide with the upper side of the image to be transmitted, and transmits the resulting signal as a transmit image 12 via the communication section 4 to the distant party.

The received image transmitted from the distant party and received by the communication section 4 will be displayed inverted by 180 degrees because the display 6a is inverted by 180 degrees from the normal orientation. Thus, the receive image rotating section 5 performs rotation processing on the picture signal so that the upper side of the received image may coincide with the upper side of the display 6*a* based on the vertical direction of the image pick-up section 1*a* detected by the image pick-up vertical direction detector 2, that is, based on the orientation information of the display 6*a*. Via this procedure, the picture signal that has undergone rotation processing is displayed in a normal orientation on the display 6*a*.

The third positioning example in FIG. 3 (*c*) shows a case where the first position of the video telephone apparatus main unit 10 shown in FIG. 3 (*a*) is rotated counterclockwise by 90 degrees. Thus, the image is rotated by the transmit image rotating section 3 so that the picked-up image is rotated clockwise by 90 degrees from the image in the reference direction (that is, the picked-up image picked up by the image pick-up section 1*a* in FIG. 3 (*a*)). The receive image rotating section 5 rotates the received image clockwise by 90 degrees from the image in the reference direction (that is, the image displayed on the display 6*a* in FIG. 3 (*a*)).

In this way, it is possible to make conversion according to the orientation of the image pick-up section 1*a* (that is, the orientation of the video telephone apparatus main unit) so that the upper side of the object whose image is picked up is always on the upper side of the image to transmit and so that the received image is normally displayed when the image is displayed on the display 6*a* in order to allow the user to transmit or display the normal image.

While the video telephone apparatus is equipped with a bent section and adapted to be collapsible, the invention is not limited to this configuration. While the image pick-up section 1*a* is provided on the button section around the bent section as shown in the figure, this configuration is not by way of limitation but the image pick-up section 1*a* may be also provided on the display 6*a*. The image pick-up section 1*a* may be adapted to be able to incline at a predetermined angle and provided to allow the user to pick up an image at any angle according to the user's position.

The image pick-up vertical direction detector 2*a* can be provided at the front or rear of the video telephone apparatus main unit 10 and the shown configuration is not by way of limitation.

A second positioning example of video telephone apparatus according to this embodiment will be described referring to FIG. 4. In FIG. 4, video telephone apparatus according to the second example can transmit and display a picked-up image and a received image in a normal state by rotating the picked-up image and the received image, irrespective of the form of talking of the video telephone apparatus.

FIGS. 4 (*a*) through (*c*) respectively show the first through third positioning examples where video telephone apparatus with a detachable image pick-up section 1*b* is used handsfree. Description of the components in FIG. 4 that serve to act the same as the means shown in the first example is omitted.

In FIG. 4, the video telephone apparatus is composed of image pick-up sections 1*b* attachably provided on the upper face (antenna side) and right and left sides of the video telephone apparatus main unit 10, an image pick-up vertical direction detector 2*b* that also serves as a connection terminal for the video telephone apparatus main unit 10 for detecting the vertical direction of the image pick-up section 1*b* via the terminal where the image pick-up section 1*b* is connected (that is, for detecting the orientation of the video telephone apparatus main unit and the orientation of the display), and a display 6*b* for displaying as an image the picture signal that has undergone rotation processing via a transmit image rotating section (not shown).

In the second example, the image pick-up section 1*b* is provided on the video telephone apparatus main unit detachably and determines the orientation of the video telephone apparatus main unit depending on which section of the video telephone apparatus main unit the image pick-up section 1*b* is inserted. In case the image pick-up section 1*b* is inserted in the right side of the video telephone apparatus, it is assumed that the video telephone apparatus is placed with the left side of the video telephone apparatus facing downward and the received image is rotated via the receive image rotating section 5 accordingly. It is not necessary to perform rotation processing on a picked image because the image pick-up section 1 is arbitrarily placed by the user so that the object image may be picked up in a normal orientation.

FIG. 4 (*a*) is an example where the longitudinal direction of the video telephone apparatus main unit according is placed horizontally to the positioning surface so that the upper side of the video telephone apparatus main unit may be on the left side in the figure. Assuming the positioning example of FIG. 4 (*a*) as a reference, image data of the object 11 whose image was picked up by the image pick-up section 1*b* is transmitted in a normal orientation as a transmit image 12 without rotation processing. The image received via the communication section 4 is displayed in a normal orientation without rotation processing.

The second positioning example in FIG. 4 (*b*) shows a case where the image is rotated by 180 degrees from the first positioning example in FIG. 4 (*a*). In this case, the received image transmitted from the distant party and received by the communication section 4 appears with the display 6*b* inverted by 180 degrees from the normal orientation, thus will be displayed as an image inverted by 180 degrees if rotation processing is not performed. Thus, the receive image rotating section 5 performs rotation processing on the picture signal that is based on the received image so that the upper side of the received image may coincide with the upper side of the display 6*b* based on the vertical direction of the image pick-up section 1*b* detected by the image pick-up vertical direction detector 2*b*, that is, the orientation of the display 6*b*. Via this procedure, the image that has undergone rotation processing is displayed in a normal orientation on the display 6*a*.

The third positioning example in FIG. 4 (*c*) shows a case where the first position of the video telephone apparatus main unit 10 shown in FIG. 4 (*a*) is rotated counterclockwise by 90 degrees. Thus, the receive image rotating section 5 rotates the received image clockwise by 90 degrees from the image in the reference direction (that is, the image displayed on the display 6*b* in FIG. 4 (*a*)).

In this way, it is possible to detachably provide an image pick-up section 1*b* on the video telephone apparatus and detect the orientation of the video telephone apparatus main unit 10 and the orientation of the display 6*b* via the image pick-up vertical direction detector 2*b* that is a connecting terminal of the image pick-up section 1*b*. It is possible for the user to view a received image in a normal orientation by rotating the image so that the image may be displayed in a normal orientation according to the orientation of the display 6*b*.

SECOND EMBODIMENT

Video telephone apparatus according to the second embodiment of the invention can transmit and display a picked-up image and a displayed image in a normal state by rotating the picked-up image and the displayed image based on the vertical direction of display means, irrespective of the form of talking of the video telephone apparatus.

Figure 5:
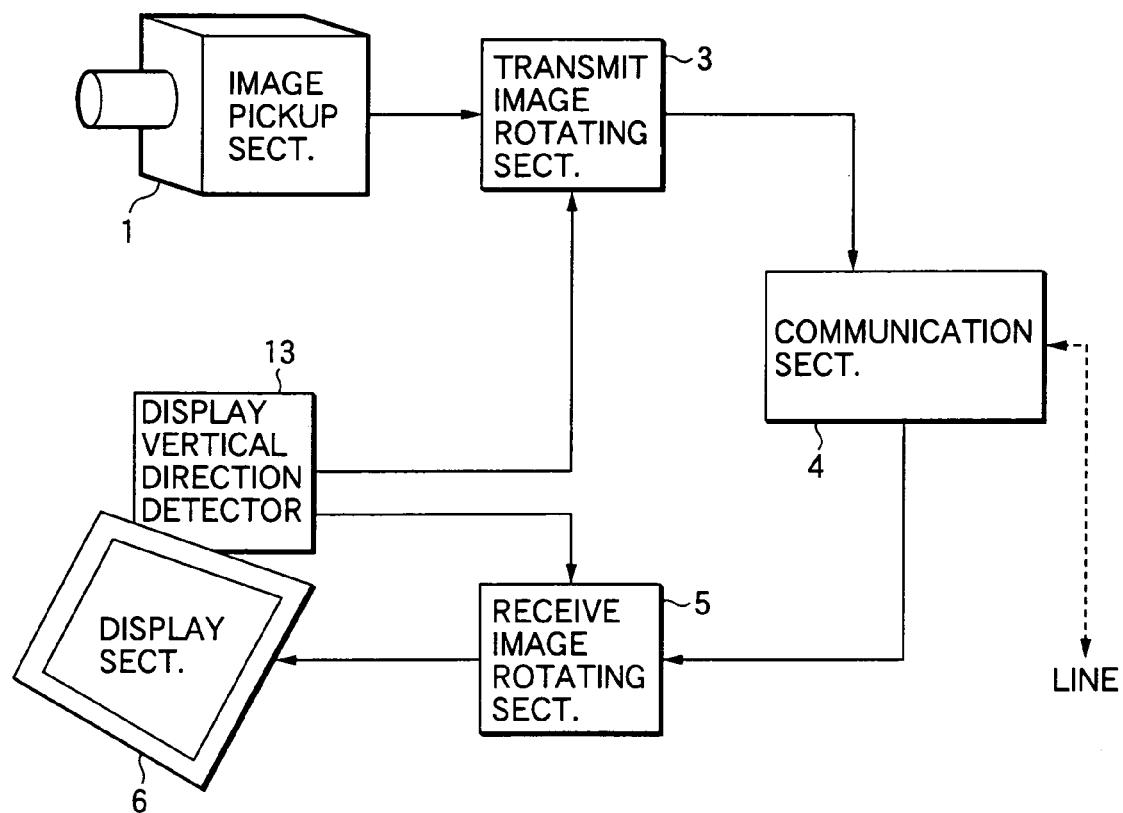
FIG. 5 is a block diagram showing the configuration of video telephone apparatus according to the second embodiment of the invention.
Figure 6A:
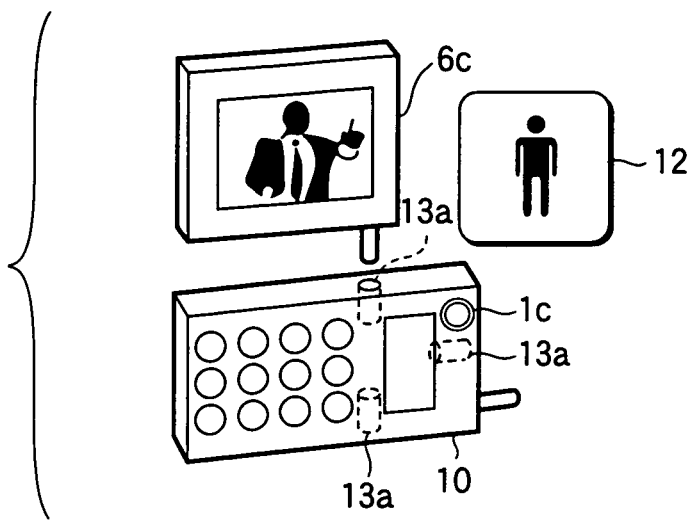
FIG. 6 is a perspective view showing a configuration of video telephone apparatus main unit having a detachable display.
Figure 6B:
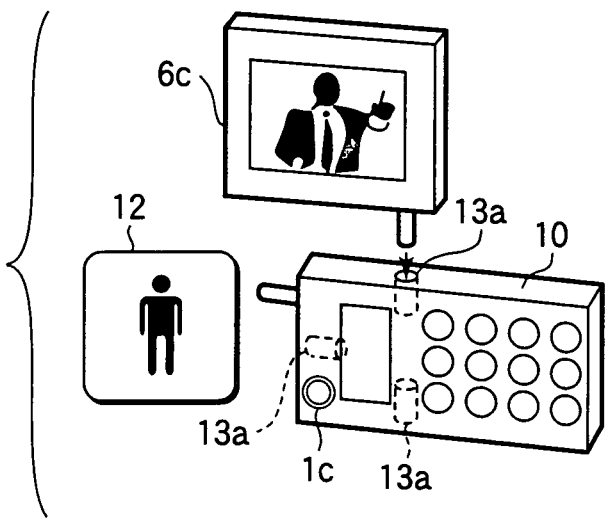
Figure 6C:
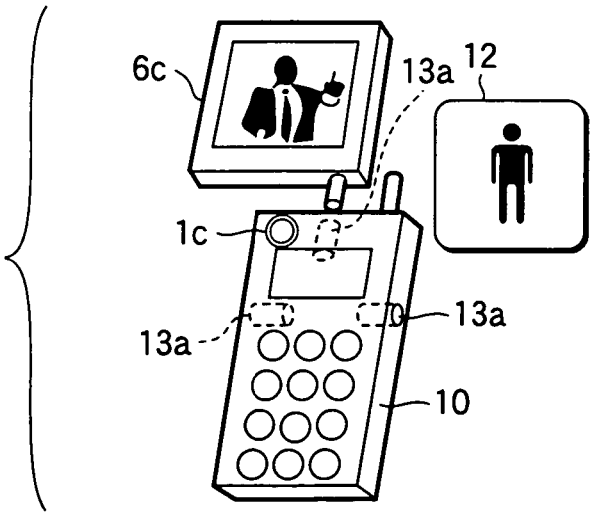

FIG. 5 is a block diagram showing the configuration of video telephone apparatus according to the second embodiment of the invention. FIG. 6 is a perspective view showing a configuration of video telephone apparatus main unit having a detachable display 6c. Description of the components in the figures that serve to act the same as the means included in the first embodiment is omitted.

As shown in FIG. 5, video telephone apparatus according to the second embodiment has an image pick-up section 1 for picking up the image of an object and generating a picture signal according to the image of the object, a transmit image rotating section 3 for receiving a picture signal from the image pick-up section 1 and performing rotation processing on the signal, and a communication section 4 for modulating and transmitting a picture signal to send from the local party via a communication circuit that is a radio link or a wired circuit.

The video telephone apparatus according to the second embodiment also has a communication section 4 for receiving and demodulating a picture signal received via a communication circuit that is a radio link or a wired circuit, a display vertical direction detector 13 corresponding to the display direction detector means for detecting the vertical direction of the display 6 and determining the orientation of the video telephone apparatus main unit, a receive image rotating section 5 for receiving the demodulated picture signal and performing rotation processing on the signal based on the vertical direction of the display 6 detected by said display vertical direction detector 13, and a display 6 for displaying as an image the picture signal that has undergone rotation processing. It is assumed that the orientation of the video telephone apparatus main unit, the image pick-up section and the display is the same as the orientation of the video telephone apparatus.

As a transmitting operation, the image of an object is picked up by an image pick-up section 1 in the first place. The image pick-up section 1 further converts image data on the target object to an electric signal to generate a picture signal and output the picture signal to the transmit image rotating section 3. In this practice, the display vertical direction detector 13 detects the vertical direction of the display 6, that is the orientation of the video telephone apparatus main unit and the orientation of the image pick-up section 1 and outputs the results to the transmit image rotating section 3 and the receive image rotating section 5. The display vertical direction detector 13 may be one similar to that shown in FIG. 2.

Next, the transmit image rotating section 3, on receiving information on the vertical direction of the display, that is, the orientation of the image pick-up section and a picture signal of a picked-up image picked up by the image pick-up section, performs rotation processing on the picture signal so that the upper side of the picked-up image in the vertical direction of the image pick-up section 1 may coincide with the upper side of the image to be transmitted to the distant party. The picture signal processed by the transmit image rotating section 3 is modulated by the communication section 4 and transmitted to the distant party via a communication circuit.

As a receiving operation, the picture signal received by the communication section 4 is demodulated and output to the receive image rotating section 5. The receive image rotating section 5 performs rotation processing on the picture signal so that the upper side of the received image is displayed at the upper side of the display 6 in the vertical direction, that is, so that the image transmitted from the distant party may be displayed normally at the local party, based on the vertical direction information of the display 6 detected by the display vertical direction detector 13.

Next, a positioning example of video telephone apparatus according to this embodiment will be described referring to FIG. 6.

In FIG. 6, video telephone apparatus is composed of an image pick-up section 1c, a display vertical direction detector 13a that also serves as a connection terminal for the video telephone apparatus main unit 10 for detecting the vertical direction of the display 6c via the terminal where the display 6c is connected (that is, for detecting the orientation of the video telephone apparatus main unit), and displays 6c detachably provided on the video telephone apparatus main unit and provided on the upper face (antenna side) and right and left sides of the video telephone apparatus main unit 10. FIGS. 6 (a) through (c) show the first to third positioning examples of video telephone apparatus main unit 10 when used hands-free. Description of the components in FIG. 6 that serve to act the same as the means shown in FIG. 5 is omitted.

The display 6c according to an embodiment in FIG. 6 is provided on the video telephone apparatus main unit detachably and determines the orientation of the video telephone apparatus main unit depending on which section of the video telephone apparatus main unit the display 6c is inserted. In case the display 6c is inserted in the right side of the video telephone apparatus, it is assumed that the video telephone apparatus is placed with the left side of the video telephone apparatus facing downward and the picked-up image is rotated via the transmit image rotating section 5 accordingly. It is not necessary to perform rotation processing on a picked image because the display 6c is arbitrarily placed by the user so that the object image may be displayed in a normal orientation.

FIG. 6 (a) is an example where the longitudinal direction of the video telephone apparatus main unit is placed horizontally to the positioning surface so that the upper side of the video telephone apparatus main unit may be on the left side in the figure. Assuming the positioning example of FIG. 6 (a) as a reference, image data of the object 11 whose image was picked up by the image pick-up section 1 is transmitted in a normal orientation as a transmit image 12 without rotation processing. The image received via the communication section is displayed in a normal orientation.

The second positioning example in FIG. 6 (b) shows a case where the image is rotated by 180 degrees from the first positioning example in FIG. 6 (a). In this case, the object whose image was picked up by the image pick-up section 1c is output as an image with the object 11 upside down to the transmit image rotating section 3. Thus, the transmit image rotating section 3 performs rotation processing on the picture signal of the object so that the upper side of the image pick-up section 1c in the vertical direction, that is, the upper side of the object in the vertical direction may coincide with the upper side of the image to be transmitted, based on the vertical direction of the display 6c detected by the display vertical direction detector 13a, and transmits the resulting signal as a transmit image 12 via the communication section 4 to the distant party.

The third positioning example in FIG. 6 (c) shows a case where the first position of the video telephone apparatus main unit 10 shown in FIG. 6 (a) is rotated counterclockwise by 90 degrees. Thus, the image is rotated by the transmit image rotating section so that the picked-up image is rotated clockwise by 90 degrees from the image in the reference direction (that is, the picked-up image picked up by the image pick-up section 1c in FIG. 6 (a)).

In this way, it is possible to detachably provide a display 6c on the video telephone apparatus and detect the orientation of the video telephone apparatus main unit 10 and the orientation of the image pick-up section 1c via display vertical direction detector 13c that is a connecting terminal of the display 6b. It is possible for the user to transmit an image in a normal orientation by making conversion according to the orientation of the image pick-up section 1c so that the upper side of the object whose image is picked up is always on the upper side of the image to transmit.

While the display 6c is detachable and the display vertical direction detector 13a serves as a connection terminal for the display 6c in FIG. 6, this is not by way of limitation but a display vertical direction detector may be separately provided at the rear or front of the video telephone apparatus main unit 10 in a variant. In this case, it is necessary to rotate a received image via the receive image rotating section 5 based on the vertical direction of the display 6c of the display vertical direction detector 13a and make sure that the image is displayed in a normal orientation.

While the video telephone apparatus is a rectangular parallelepiped with a bent section and collapsible in the first and second embodiments of the invention, this is not by way of limitation but the orientation of a picked-up image can be converted as required according to the orientation of the image pick-up and the orientation of a received image to display can be converted as required according to the orientation of the display.

THIRD EMBODIMENT

Video telephone apparatus according to the third embodiment can transmit and display a picked-up image and a received image in a normal state by rotating the picked-up image and the received image based on the vertical direction of iii, irrespective of the form of talking of the video telephone apparatus. Further, the video telephone apparatus according to the third embodiment can generate voice data to transmit to the distant party via communication means and voice data received from the distant party via communication means according to the form of talking of the video telephone apparatus.

Figure 7:
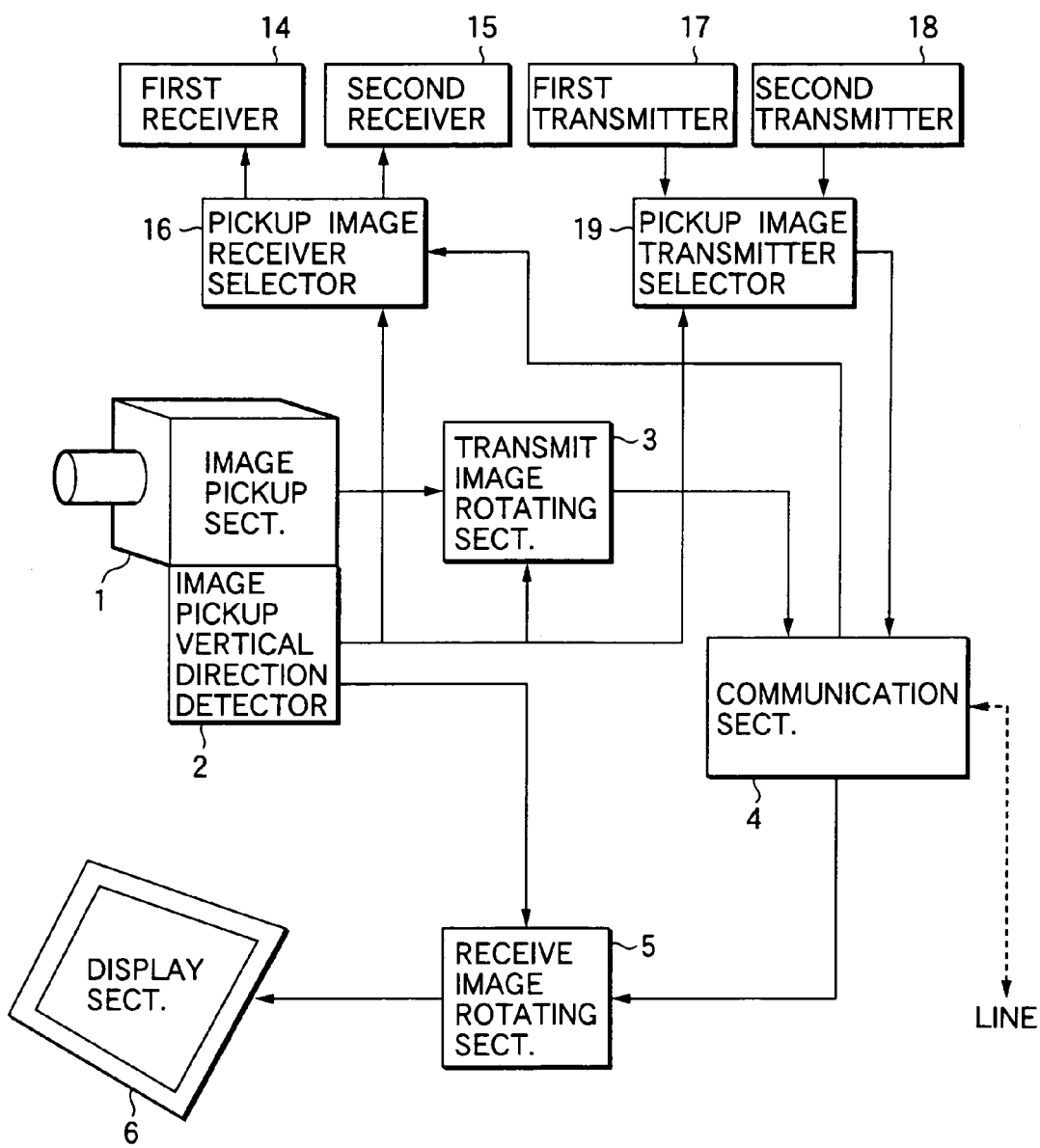
FIG. 7 is a block diagram showing the configuration of video telephone apparatus according to the third embodiment of the invention.

FIG. 7 is a block diagram showing the configuration of video telephone apparatus according to the third embodiment of the invention. Components in the figure that serve to act the same as the means included in the first and second embodiments are given the same numbers and the corresponding description is omitted.

As shown in FIG. 7, video telephone apparatus according to the third embodiment of the invention has an image pick-up section 1 for picking up the image of an object and generating a picture signal according to the image of the object, an image pick-up vertical direction detector 2 for detecting the vertical direction of the an image pick-up section 1, a transmit image rotating section 3 for receiving a picture signal from the image pick-up section 1 and performing rotation processing on the signal, and a communication section 4 for transmitting/receiving and modulating/demodulating a picture signal via a communication circuit that is a radio link or a wired circuit, a receive image rotating section 5 for receiving the demodulated picture signal and performing rotation processing on the signal, and a display 6 for displaying as an image the picture signal that has undergone rotation processing.

The video telephone apparatus according to the third embodiment also has a first receiver 14 corresponding to first receiver means as a close-talking receiver, a second receiver 15 corresponding to second receiver means as a speaker for hands-free talking, a picked-up image receiver selector 16 corresponding to picked-up image receiver selector means, a first transmitter 17 corresponding to first transmitter means as a close-talking microphone, a second transmitter 18 corresponding to second transmitter means as a hands-free microphone, and a picked-up image transmitter selector 19 corresponding to picked-up image transmitter selector means. The second receiver 15 has an audio circuit whose amplification ratio differs from that of the first receiver 14 and regenerates an audio signal received from the communication section to a signal level that differs from that of the first receiver 14. The second transmitter 18 has an amplification ratio different from that of the first transmitter 17 and regenerates an input audio signal to a signal level that differs from that of the first receiver 14. It is assumed that the orientation of the video telephone apparatus main unit, the image pick-up section and the display is the same as the orientation of the video telephone apparatus.

The picked-up image receiver selector 16 selects the first receiver 14 as a close-talking receiver when the orientation of the video telephone apparatus main unit is fit for close-talking as shown in FIG. 3 (c), FIG. 4 (c) or FIG. 6 (c) and selects the second receiver 15 as a hands-free receiver when the orientation of the video telephone apparatus main unit is fit for hands-free talking as shown in FIG. 3 (a), FIG. 3 (b), FIG. 4 (a), FIG. 4 (b), FIG. 6 (a) or FIG. 6 (b), based on the output results of the image pick-up vertical direction detector 2, that is, the orientation of the video telephone apparatus main unit.

In case the image pick-up section 1 is detachable, the picked-up image receiver selector 16 may select the second receiver 15 as a hands-free receiver when the image pick-up section 1 is attached to the video telephone apparatus main unit and the first receiver 14 as a close-talking receiver when the image pick-up section 1 is not attached to the video telephone apparatus main unit.

It is also possible to paste the image pick-up section 1 with the first receiver 14 as a close-talking receiver back to back and attach the resulting component rotatably on the video telephone apparatus main unit so that the second receiver 15 is selected when the image pick-up section 1 is in the same direction as the front direction of the video telephone apparatus and the first receiver 14 is selected when the first receiver 14 is in the same direction as the front direction of the video telephone apparatus via rotating operation of the operator. The first receiver and the second receiver may not be separate but share the same speaker and the amplification ratio of the received audio signal is switched to regenerate the audio signal to two separate signal levels, based on the output results of the image pick-up vertical direction detector 2.

Same as the picked-up image receiver selector 16, the picked-up image transmitter selector 19 selects the first transmitter 17 as a close-talking microphone when the orientation of the video telephone apparatus main unit is fit for close-talking and selects the second transmitter 18 as a hands-free microphone when the orientation of the video telephone apparatus main unit is fit for hands-free talking, based on the output results of the image pick-up vertical direction detector 2, that is, the orientation of the video telephone apparatus main unit.

In case the image pick-up section 1 is detachable, the picked-up image transmitter selector 19 may select the second receiver 15 as a hands-free microphone when the image pick-up section 1 is attached to the video telephone apparatus main unit and the first transmitter 18 as a close-talking microphone when the image pick-up section 1 is not attached to the video telephone apparatus main unit.

It is also possible to paste the image pick-up section 1 with the first transmitter 17 as a close-talking microphone back to back and attach the resulting component rotatably on the video telephone apparatus main unit so that the second transmitter 18 is selected when the image pick-up section 1 is in the same direction as the front direction of the video telephone apparatus and the first transmitter 18 is selected when the first transmitter 18 is in the same direction as the front direction of the video telephone apparatus via rotating operation of the operator. The first transmitter and the second transmitter may not be separate but share the same microphone and the amplification ratio of the input audio signal is switched to regenerate the audio signal to two separate signal levels, based on the output results of the image pick-up vertical direction detector 2.

In the aforementioned configuration, when transmitting voice data, the picked-up image transmitter selector 19 receives the vertical direction of the image pick-up section 1 from the image pick-up vertical direction detector means 2 and selects and enables the first transmitter 17 or the second transmitter 18 based on the vertical direction of the image pick-up section 1, that is, the orientation of the video telephone apparatus main unit, receives the transmit audio signal output from the selected receiver means, then outputs the signal to the communication section 4.

The communication section 4, on receiving the generated transmit signal together with a picture signal output from the transmit image rotating section 3, modulates the both signals and transmits the resulting signals to the distant party via a communication circuit.

On the other hand, when receiving voice data, the communication section 4 demodulates a received picture signal and an audio signal and outputs the resulting signals to the receive image rotating section 5 and the picked-up image receiver selector 16 respectively. The picked-up image receiver selector 16 selects the first receiver or the second receiver based on the vertical direction of the image pick-up section 1 from the image pick-up vertical direction detector means 2, that is, the orientation of the video telephone apparatus main unit, and outputs the receive audio signal output from the communication section 4 to the selected receiver means. The signal is regenerated to an audio signal fit for the form of talking of the video telephone apparatus via the receiver means.

In this way, it is possible for the user to transmit an image in a normal orientation by making conversion according to the orientation of the image pick-up section 1, that is, the orientation of the video telephone apparatus main unit, so that the upper side of the object whose image is picked up is always on the upper side of the image to transmit and that the received image is displayed in a normal orientation on the display 6.

It is possible to switch between receiver means and between transmitter means according to the orientation of the video telephone apparatus main unit thus allowing the user to make proper conversation fit for the form of talking.

FOURTH EMBODIMENT

Video telephone apparatus according to the fourth embodiment can transmit and display a picked-up image and a received image in a normal state by rotating the picked-up image and the received image based on the vertical direction of display means, irrespective of the form of talking of the video telephone apparatus. Further, the video telephone apparatus according to the fourth embodiment can generate voice data to transmit to the distant party via communication means and voice data received from the distant party via communication means according to the form of talking of the video telephone apparatus.

Figure 8:
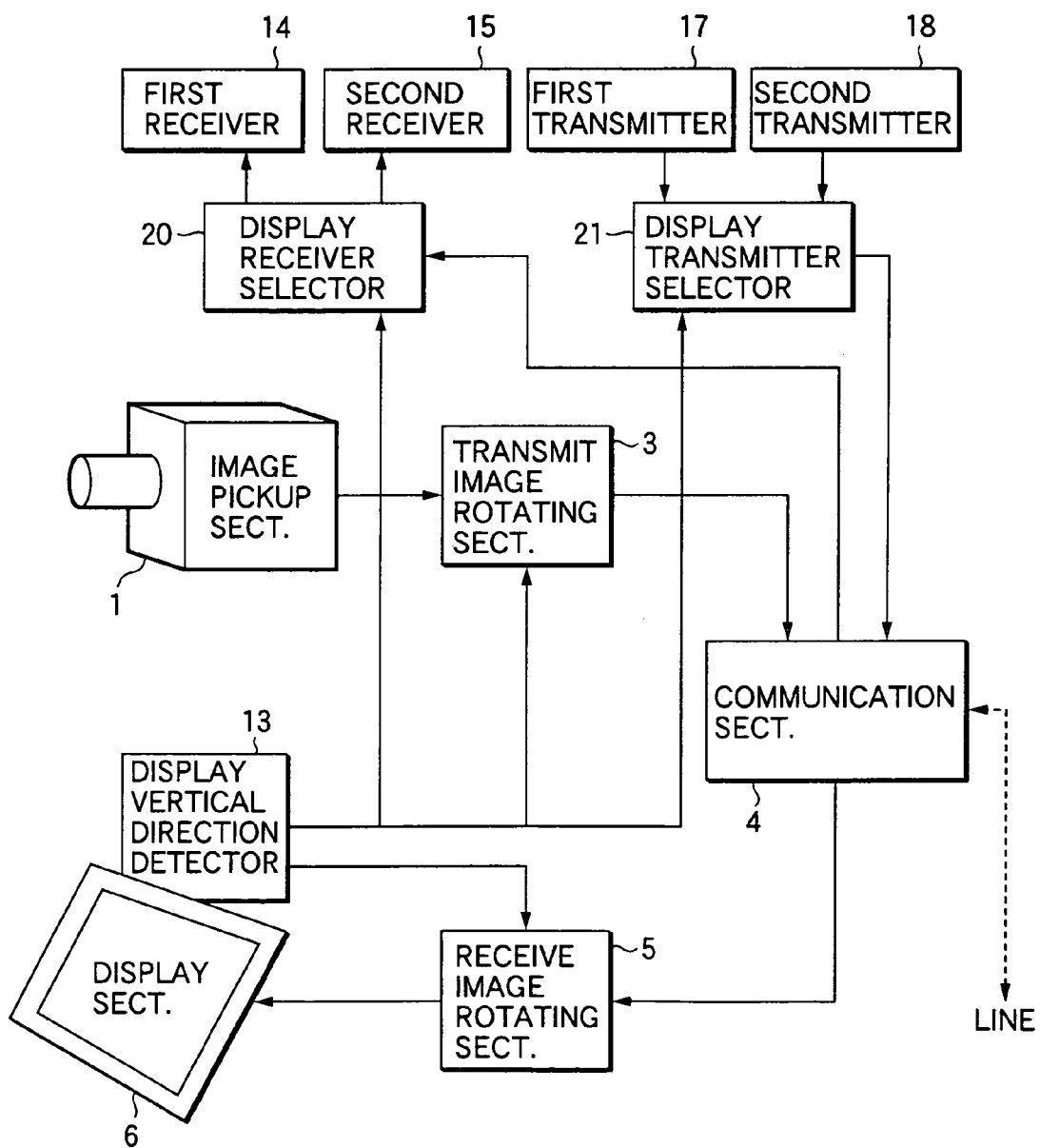
FIG. 8 is a block diagram showing the configuration of video telephone apparatus according to the fourth embodiment of the invention.
Figure 9:
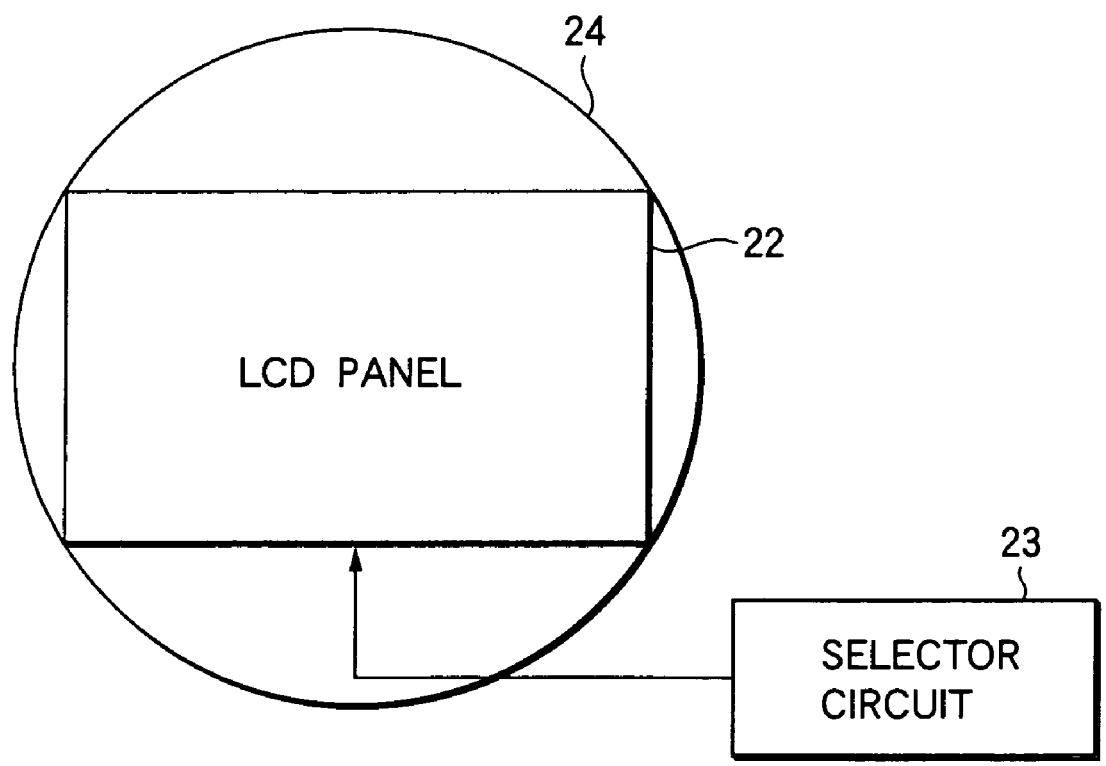
FIG. 9 is a block diagram showing the configuration of conventional video telephone apparatus.

FIG. 8 is a block diagram showing the configuration of video telephone apparatus according to the fourth embodiment of the invention. Components in the figure that serve to act the same as the means included in the first through third embodiments are given the same numbers and the corresponding description is omitted.

As shown in FIG. 8, video telephone apparatus according to the fourth embodiment of the invention has an image pick-up section 1 for picking up the image of an object, a transmit image rotating section 3 for performing rotation processing on the signal whose image is picked up, and a communication section 4 for transmitting/receiving and modulating/demodulating a picture signal, a display vertical direction detector 13 for detecting the vertical direction of the display 6, a receive image rotating section 5 for performing rotation processing on a received picture signal, and a display 6 for displaying as an image the picture signal that has undergone rotation processing.

The video telephone apparatus according to the fourth embodiment also has a first receiver 14 as a close-talking receiver, a second receiver 15 as a speaker for hands-free talking, a display receiver selector 20 corresponding to display receiver selector means, a first transmitter 17 as a close-talking microphone, a second transmitter 18 as a hands-free microphone, and a display transmitter selector 21 corresponding to display transmitter selector means. It is assumed that the orientation of the video telephone apparatus main unit, the image pick-up section and the display is the same as the orientation of the video telephone apparatus.

The display receiver selector 20 selects the first receiver 14 as a close-talking receiver when the orientation of the video telephone apparatus main unit is fit for close-talking and selects the second receiver 15 as a hands-free receiver when the orientation of the video telephone apparatus main unit is fit for hands-free talking, based on the output results of the display vertical direction detector 13, that is, the orientation of the video telephone apparatus main unit.

In case the display 6 is detachable, the display receiver selector 20 may select the second receiver 15 for hands-free talking when the display 6 is attached to the video telephone apparatus main unit and the first receiver 14 for close-talking when the display 6 is not attached to the video telephone apparatus main unit.

It is also possible to paste the display 6 with the first transmitter 17 for close-talking back to back and attach the resulting component rotatably on the video telephone apparatus main unit so that the second transmitter 18 is selected when the display 6 is in the same direction as the front direction of the video telephone apparatus and the first transmitter 17 is selected when the first transmitter 17 is in the same direction as the front direction of the video telephone apparatus via rotating operation of the operator. The first transmitter and the second transmitter may not be separate but share the same microphone and the amplification ratio of the input audio signal is switched to regenerate the audio signal to two separate signal levels, based on the output results of the display vertical direction detector 13.

In the aforementioned configuration, when transmitting voice data, the display transmitter selector 21 receives the vertical direction of the display 6 from the display vertical direction detector 13 and selects and enables the first transmitter 17 or the second transmitter 18 based on the vertical direction of the display 6, that is, the orientation of the video telephone apparatus main unit. The display transmitter selector 21 generates a transmit audio signal based on the voice data output from the selected transmitter means, then outputs the signal to the communication section 4.

The communication section 4, on receiving the generated transmit signal together with a picture signal processed by the transmit image rotating section, modulates the both signals and transmits the resulting signals to the distant party via a communication circuit.

On the other hand, when receiving voice data, the communication section 4 demodulates a received picture signal and an audio signal and outputs the resulting signals to the receive image rotating section 5 and the display receiver selector 20 respectively. The display receiver selector 20 selects the first receiver or the second receiver based on the vertical direction of the display 6 from the display vertical direction detector 13, that is, the orientation of the video telephone apparatus main unit, and outputs the receive audio signal output from the communication section 4 to the selected receiver means. The signal is regenerated to an audio signal fit for the form of talking of the video telephone apparatus via the receiver means.

In this way, it is possible for the user to transmit an image in a normal orientation by making conversion according to the orientation of the display 6, that is, the orientation of the video telephone apparatus main unit, so that the upper side of the object whose image is picked up is always on the upper side of the image to transmit and that the received image is displayed in a normal orientation on the display 6.

It is possible to switch between receiver means and between transmitter means according to the state of the display 6 thus allowing the user to make proper conversation fit for the form of talking.

INDUSTRIAL APPLICABILITY

As mentioned earlier, the invention has advantages that it possible to provide video telephone apparatus where the orientation of a picked-up image or a received image can be changed according to the orientation of the image pick-up section or the display, thus allowing transmission or display of a proper image at any time.

Via the invention, it is possible to select receiver means and transmitter means fit for the orientation of the image pick-up means or the display means.

The invention claimed is:

1. Video telephone apparatus comprising image pick-up means for picking up the image of an object and generating a transmit picture signal according to the image of the object; communication means for transmitting and receiving said transmit picture signal and a receive picture signal; display means for displaying video information based on the receive picture signal received from said communication means; and a main body provided with the image pick-up means, the communication means, and the display means, and having a bent section adapted to be collapsible to close the main body; characterized in that said image pick-up means comprises detector means for detecting the orientation of said video telephone apparatus and a rotating means for rotating the orientation of an image in at least either of said transmit picture signal and said receive picture signal based on the detected orientation of said image pick-up means and independent of the orientation of a distant party video telephone apparatus.

2. Video telephone apparatus according to claim 1, characterized in that detector means for detecting the orientation of said video telephone apparatus has image pick-up direction detector means for detecting the vertical direction of said image pick-up means.

3. Video telephone apparatus according to claim 1, characterized in that detector means for detecting the orientation of said video telephone apparatus has display direction detector means for detecting the vertical direction of said display means.

4. Video telephone apparatus according to claim 1, characterized in that said rotating means has transmit image rotating means for performing rotation processing on said transmit picture signal based on the orientation of said video telephone apparatus.

5. Video telephone apparatus according to claim 1, characterized in that said rotating means has receive image rotating means for performing rotation processing on said receive picture signal based on the orientation of said video telephone apparatus.

6. Video telephone apparatus according to claim 1, characterized in that said video telephone apparatus comprises a first receiver means for regenerating a receive audio signal received from said communication means, a second receiver means for regenerating the receive audio signal received from said communication means to a signal level different from that of the first receiver means, and a receiver selector means for switching between said first receiver means and said second receiver means based on the orientation of said video telephone apparatus.

7. Video telephone apparatus according to claim 1, characterized in that said video telephone apparatus comprises a first transmitter means for converting voice data into an electric signal to generate a transmit audio signal, a second transmitter means for converting voice data into an electric signal to generate a transmit audio signal whose signal level differs from that of the first receiver transmitter means, and a transmitter selector means for switching between said first transmitter means and said second transmitter means based on the orientation of said video telephone apparatus.

8. Video telephone apparatus according to claim 6, characterized in that said receiver selector means has picked-up image receiver means for switching between said first receiver means and said second receiver means based on the vertical direction of image pick-up means detected by image pick-up means detector means.

9. Video telephone apparatus according to claim 6, characterized in that said receiver selector means is display receiver selector means and switches between said first receiver means and said second receiver means based on the vertical direction or horizontal direction of the display means detected by display means detector means.

10. Video telephone apparatus according to claim 7, characterized in that said transmitter selector means has picked-up image transmitter means for switching between said first transmitter means and said second transmitter means based on the vertical direction of image pick-up means detected by image pick-up means detector means.

11. Video telephone apparatus according to claim 7, characterized in that said transmitter selector means has display transmitter selector means for switching between said first transmitter means and said second transmitter means based on the vertical direction of display means detected by display means detector means.

12. Video telephone apparatus according to claim 1, wherein an upper side of the picked-up image in gravity direction of said video telephone apparatus is rotated so as to be an upper side of the picture of the transmit picture signal is made as the upper side of the picked up image in orientation.

13. Video telephone apparatus comprising image pick-up means for picking up the image of an object and generating a transmit picture signal according to the image of the object; communication means for transmitting and receiving said transmit picture signal and a receive picture signal; display means for displaying video information based on the receive picture signal received from said communication means; and a main body provided with image pick-up means, the communication means, and display means, and having a bent section adapted to be collapsible to close the main body; characterized in that said video telephone apparatus comprises detector means for detecting the orientation of said image pick-up means and a rotating means for generating said transmit picture signal by rotating the orientation of an image picked up by said image pick-up means based on the detected orientation of said image pick-up means.

14. The video telephone apparatus according to claim 13, wherein said rotating means further generates an image for displaying by rotating the orientation of an image of said receive picture signal.

15. Video telephone apparatus according to claim 13, wherein an upper side of the picked-up image in gravity direction of said video telephone apparatus is rotated so as to generate said transmit picture signal which forms a transmit picture in which an upper side of the transmit picture is same as the upper side of the picked up image in orientation.

* * * * *